(12) United States Patent
Wei et al.

(10) Patent No.: US 12,111,782 B2
(45) Date of Patent: *Oct. 8, 2024

(54) METHOD AND SYSTEM FOR ANALYZING DATA

(71) Applicant: Nanning FuLian FuGui Precision Industrial Co., Ltd., Nanning (CN)

(72) Inventors: Gan-Hao Wei, Shenzhen (CN); Li-Wei Hung, New Taipei (TW)

(73) Assignee: Nanning FuLian FuGui Precision Industrial Co., Ltd., Nanning (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/370,010

(22) Filed: Sep. 19, 2023

(65) Prior Publication Data

US 2024/0004819 A1 Jan. 4, 2024

Related U.S. Application Data

(63) Continuation of application No. 17/744,934, filed on May 16, 2022, now Pat. No. 11,868,295.

(30) Foreign Application Priority Data

May 28, 2021 (CN) .......................... 202110594916.4

(51) Int. Cl.
G06F 13/38 (2006.01)
H04L 43/18 (2022.01)

(52) U.S. Cl.
CPC ............ *G06F 13/385* (2013.01); *H04L 43/18* (2013.01)

(58) Field of Classification Search
CPC ............................... G06F 13/385; H04L 43/18
USPC .......................................................... 709/201
See application file for complete search history.

(56) References Cited

U.S. PATENT DOCUMENTS

| 6,172,972 | B1 | 1/2001 | Birdwell et al. |
| 2004/0194000 | A1 | 9/2004 | Lin et al. |
| 2006/0255979 | A1 | 11/2006 | Lewis |
| 2009/0265778 | A1 | 10/2009 | Wahl |
| 2013/0148510 | A1 | 6/2013 | Kang |

FOREIGN PATENT DOCUMENTS

| CN | 105183579 A | 12/2015 |
| TW | 200907787 A | 2/2009 |
| TW | 201137600 A | 11/2011 |

*Primary Examiner* — James E Springer
(74) *Attorney, Agent, or Firm* — ScienBiziP, P.C.

(57) ABSTRACT

A method and system for accelerating analysis of large-scale data that reads a data packet from a queue, and after performing data processing on the data packet, a first high, middle, and low byte of the processed data packet is cyclically read; a preset signal reference value is read, and the preset signal reference value is converted into a collected value according to a preset signal transformation ratio and a correction factor; the collected value is converted into an integer value, and the integer value is split into a second high, middle, and low byte; and the first high, middle, and low byte of the processed data packet is compared with the second high, middle and low byte of the integer value in a preset way. A determination as to whether the data of the packet is abnormal or not is made based on the result of the comparison.

15 Claims, 3 Drawing Sheets

METHOD AND SYSTEM FOR ANALYZING DATA

CROSS-REFERENCE TO RELATED APPLICATIONS

This application claims priority to Chinese Patent Application No. 202110594916.4 filed on May 28, 2021, the contents of which are incorporated by reference herein.

FIELD

The subject matter herein generally relates to data analyzing technology, in particular to a data analyzing method and system.

BACKGROUND

In industrial production, data is collected from everywhere. Even though operating at high-speed, the analysis of large amounts of data is cumbersome and the processing brings tremendous pressure to a server. A streamlining and optimization of the analysis of data would greatly reduce pressure on the server and improve the stability of the service program.

BRIEF DESCRIPTION OF THE DRAWINGS

Implementations of the present technology will now be described, by way of example only, with reference to the attached figures, wherein.

DETAILED DESCRIPTION

Figure 1:
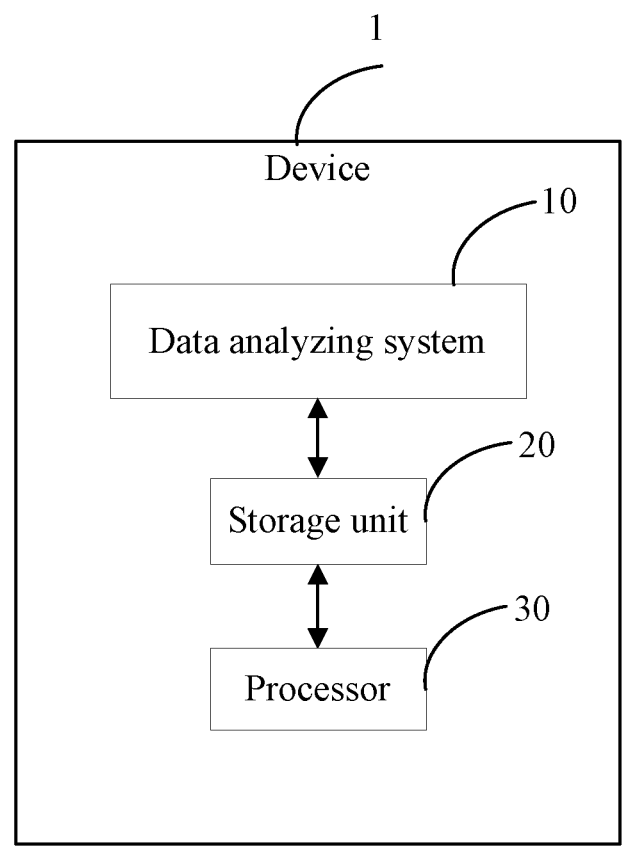
FIG. 1 is a block diagram illustrating functional modules of a device for analyzing data according to an exemplary embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to;" it specifically indicates open-ended inclusion or membership in a so-described combination, group, series, and the like.

FIG. 1 is a block diagram of an exemplary embodiment of functional modules of a device 1. The device 1 includes a data analyzing system 10, a storage unit 20, and a processor 30.

The storage unit 20 includes at least one type of readable storage medium, the readable storage medium includes a flash memory, a hard disk, a multimedia card, a card-type memory (for example, SD or DX memory, etc.), a random access memory (RAM), a static random access memory (SRAM), a read only memory (ROM), an electrically erasable programmable read only memory (EEPROM), a programmable read only memory (PROM), a magnetic memory, a magnetic disk, an optical disk, and other components. The processor 40 may be a central processing unit (CPU), a controller, a microcontroller, a microprocessor, or other data processing chip.

Figure 2:
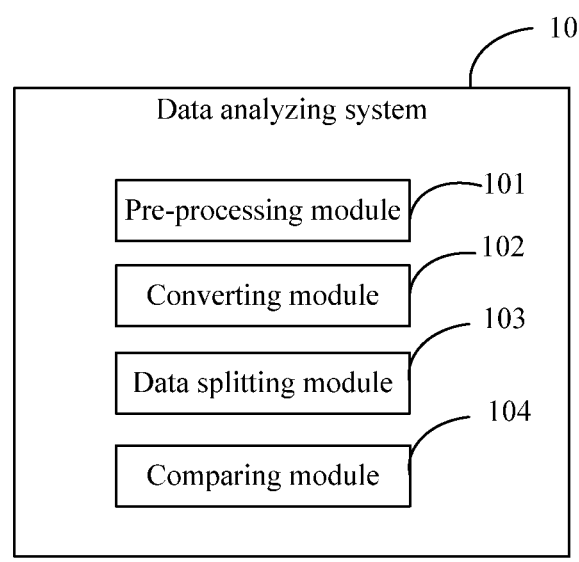
FIG. 2 is a block diagram illustrating functional modules of a system for analyzing data according to an exemplary embodiment of the present disclosure.

FIG. 2 illustrates a block diagram of an exemplary embodiment of functional modules of the data analyzing system 10.

The data analyzing system 10 includes a pre-processing module 101, a converting module 102, a data splitting module 103, and a comparing module 104. The modules are configured to be executed by one or more processors (in the embodiment, one processor 30). The modules referred to are computer program segments that perform a specific instruction. The storage unit 20 is used to store program code and other data of the data analyzing system 10. The processor 30 is used to execute the program code stored in the storage unit 20.

The pre-processing module 101 reads a data packet from a queue, and after performing data processing on the data packet, cyclically reads a first high, middle, and low byte of the processed data packet.

In the embodiment, a header and tail of the data packet both carry some transmission parameters, in order to make the data more checkable and accurate, and the pre-processing module 101 removes the header and tail of the data packet after reading the data packet from the queue.

The converting module 102 reads a preset signal reference value, and converts the signal reference value into a collected value according to a preset signal transformation ratio and correction factor.

For example, in some embodiments, the received signal reference value is an electrical current value, but what needs to be collected is a temperature value, and the current value can be converted into the temperature value via the signal transformation ratio and correction of a sensor. In the embodiment, the signal transformation ratio and correction factor are preset by a developer.

The data splitting module 103 converts the collected value into an integer value, and splits the integer value into a second high, middle, and low byte.

Preferably, the data splitting module 103 converts the collected value into a 24 bit integer value, and splits the 24 bit integer value into the second high, middle, and low byte.

The comparing module 104 compares the first high, middle, and low byte of the processed data packet with the second high, middle, and low byte of the integer value in a preset way, and determines whether the data packet is abnormal data or not according to the comparison.

Specifically, the comparing module 104 further compares a high byte value of the first high, middle, and low byte with the high byte value of the second high, middle, and low byte. When the high byte value of the first high, middle, and low byte is different from the high byte value of the second high, middle, and low byte, the comparing module 104 determines that the data packet is abnormal in respect of its data.

When the high byte value of the first high, middle, and low byte is same as the high byte value of the second high, middle, and low byte, the comparing module 104 splices the high byte with a middle byte of the first high, middle, and low byte to obtain a spliced high and middle byte value of the first high, middle, and low byte, and splices the high byte with the middle byte of the second high, middle, and low byte to obtain the spliced high and middle byte value of the second high, middle, and low byte. The spliced high and middle byte value of the first high, middle, and low byte is compared with the spliced high and middle byte value of the second high, middle, and low byte. If the spliced high and middle byte value of the first high, middle, and low byte is different from the spliced high and middle byte value of the second high, middle, and low byte, the comparing module 104 further determines that the data packet is abnormal.

The comparing module 104 further:

Splices the high byte, middle byte with a low byte of the first high, middle, and low byte to obtain a spliced high, middle, and low byte value of the first high, middle, and low byte, and splices the high byte, middle byte with a low byte of the second high, middle, and low byte to obtain the spliced high, middle, and low byte value of the second high, middle, and low byte when the spliced high and middle byte value of the first high is same as the spliced high and middle byte value of the first high, middle, and low byte. When the spliced high, middle, and low byte value of the first high, middle, and low byte is compared with the spliced high, middle, and low byte value of the second high, middle, and low byte and found to be different, the data packet is determined to be abnormal.

The comparing module 104 further determines that the data packet is normal when the spliced high, middle, and low byte value of the first high is found to be the same as the spliced high, middle, and low byte value of the second high, middle, and low byte.

If the value of the data packet is found to be abnormal in the high or middle byte, the abnormal data packet can be quickly identified without comparing it to the low byte value, which can improve the efficiency of data analysis.

In the embodiment, the data packet can be separated and compared according to high, middle, and low bits, simplifying the data analyzing process and improving the efficiency of data analysis.

Figure 3:
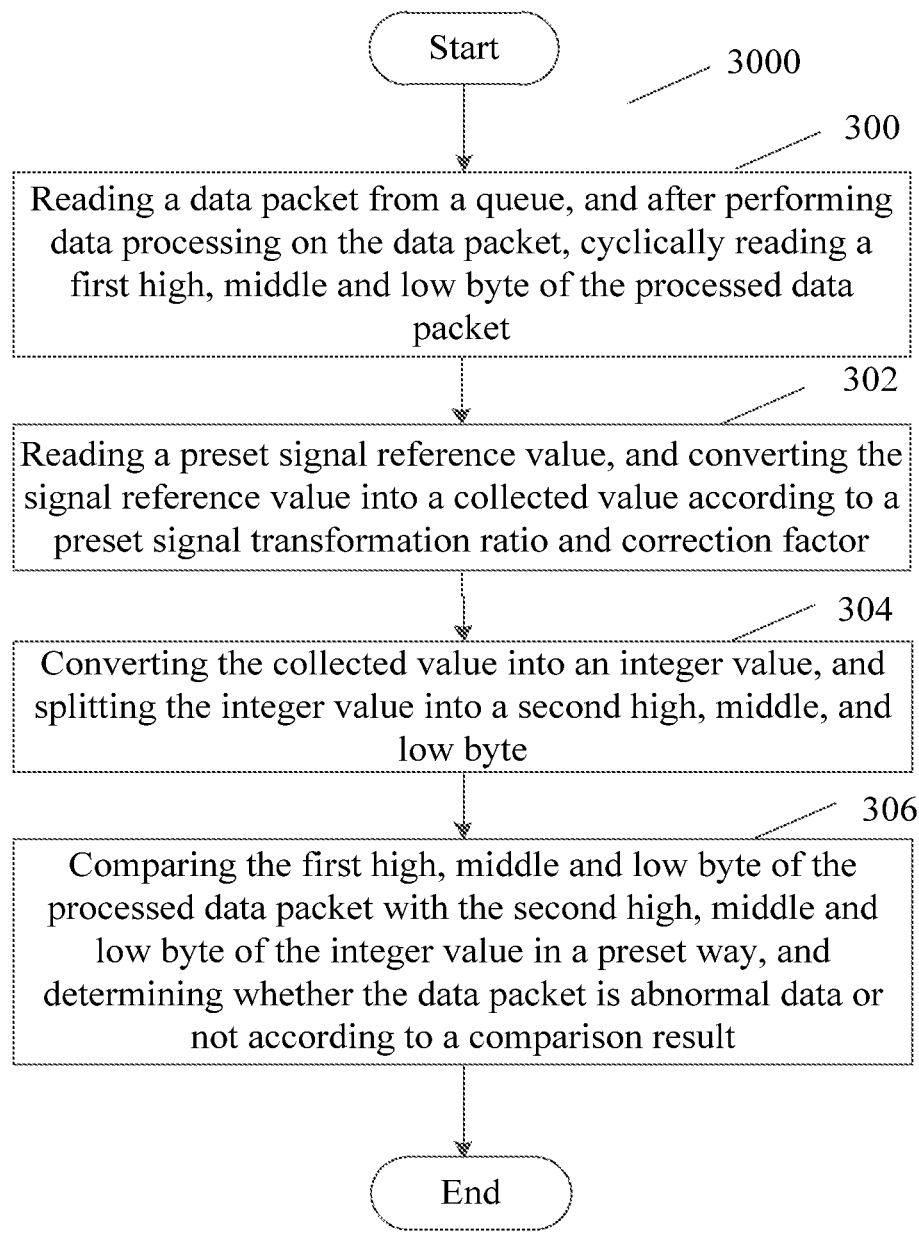
FIG. 3 is a flowchart illustrating a method for analyzing data in accordance with an embodiment of the present disclosure.

FIG. 3 illustrates a flowchart is presented in accordance with an embodiment of a method for analyzing data 3000, applied in a device 1, and the function modules 101-104, as FIG. 2 illustrates, are executed by the processor 30. Each block shown in FIG. 3 represents one or more processes, methods, or subroutines, carried out in the exemplary method 3000. Additionally, the illustrated order of blocks is by example only and the order of the blocks can be changed. The method 3000 can begin at block 300.

At block 300, reading a data packet from a queue, and after performing data processing on the data packet, cyclically reading a first high, middle, and low byte of the processed data packet.

In the embodiment, a header and tail of the data packet both carry some transmission parameters, in order to make the data more checkable and accurate, and the device 1 removes the header and tail of the data packet after reading the data packet from the queue.

At block 302, reading a preset signal reference value, and converting the signal reference value into a collected value according to a preset signal transformation ratio and correction factor.

For example, in some embodiments, the received signal reference value is an electrical current value, but what needs to be collected is a temperature value, and the current value can be converted into the temperature value via the signal transformation ratio and correction of a sensor. In the embodiment, the signal transformation ratio and correction factor are preset by a developer.

At block 304, converting the collected value into an integer value, and splitting the integer value into a second high, middle, and low byte.

Preferably, the collected value is converted into a 24-bit integer value, and the 24 bit integer value is split into the second high, middle, and low byte.

At block 306, comparing the first high, middle, and low byte of the processed data packet with the second high, middle, and low byte of the integer value in a preset way, and determining whether the data packet is abnormal data or not according to the comparison.

Specifically, the block 306 further includes:

Comparing a high byte value of the first high, middle, and low byte with the high byte value of the second high, middle, and low byte; when the high byte value of the first high, middle, and low byte is different from the high byte value of the second high, middle, and low byte, determining that the data packet is abnormal in respect of its data.

Further, when the high byte value of the first high, middle, and low byte is same as the high byte value of the second high, middle, and low byte, the comparing module 104 splices the high byte with a middle byte of the first high, middle, and low byte to obtain a spliced high and middle byte value of the first high, middle, and low byte, and splices the high byte with the middle byte of the second high, middle, and low byte to obtain the spliced high and middle byte value of the second high, middle, and low byte. The spliced high and middle byte value of the first high is compared with the spliced high and middle byte value of the second high, middle, and low byte. If the spliced high and middle byte value of the first high is different from the spliced high and middle byte value of the second high, middle, and low byte, the comparing module 104 further determines that the data packet is abnormal.

Further, splicing the high byte, middle byte with a low byte of the first high, middle, and low byte to obtain a spliced high, middle, and low byte value of the first high, middle, and low byte, and splices the high byte, middle byte with a low byte of the second high, middle, and low byte to obtain the spliced high, middle, and low byte value of the second high, middle, and low byte when the spliced high and middle byte value of the first high is same as the spliced high and middle byte value of the first high, middle, and low byte. When the spliced high, middle, and low byte value of the first high is compared with the spliced high, middle, and low byte value of the second high, middle and low byte and found to be different, the data packet is determined to be abnormal.

Further, determining that the data packet is normal when the spliced high, middle, and low byte value of the first high is found to be the same as the spliced high, middle, and low byte value of the second high, middle, and low byte.

If the value of the data packet is found to be abnormal in the high or middle byte, the abnormal data packet can be quickly identified without comparing it to the low byte value, which can improve the efficiency of data analysis.

In the embodiment, the data packet can be separated and compared according to high, middle, and low bits, simplifying the data analyzing process and improving the efficiency of data analysis.

The embodiments shown and described above are only examples. Many details are often found in the art such as the other features of method for data processing. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for analyzing data, executed in a device, the method comprising:
    reading a data packet from a queue, and after performing data processing on the data packet, cyclically reading a first high, middle, and low byte of the processed data packet;
    reading a preset signal reference value, and converting the preset signal reference value into a collected value according to a preset signal transformation ratio and a correction factor;
    converting the collected value into an integer value, and splitting the integer value into a second high, middle, and low byte; and
    sequentially comparing the first high, middle and low byte of the processed data packet with the second high, middle and low byte of the integer value in a preset way, and determining whether the processed data packet is abnormal data according to a comparison result.

2. The method as claimed in claim 1, wherein performing the data processing on the data packet further comprises:
    removing a header and a tail of the data packet.

3. The method as claimed in claim 1, wherein sequentially comparing the first high, middle, and low byte of the processed data packet with the second high, middle, and low byte of the integer value in the preset way, and determining whether the processed data packet is the abnormal data according to the comparison result, further comprises:
    comparing a high byte value of the first high, middle, and low byte with a high byte value of the second high, middle, and low byte; and
    determining the processed data packet is the abnormal data when the high byte value of the first high, middle, and low byte is different from the high byte value of the second high, middle, and low byte.

4. The method as claimed in claim 3, wherein sequentially comparing the first high, middle, and low byte of the processed data packet with the second high, middle, and low byte of the integer value in the preset way, and determining whether the processed data packet is the abnormal data according to the comparison result, further comprises:
    splicing a high byte with a middle byte of the second high, middle, and low byte to obtain a spliced high and middle byte value of the second high, middle and low byte when the high byte value of the first high, middle, and low byte is same as the high byte value of the second high, middle, and low byte, and splicing a high byte with a middle byte of the first high, middle, and low byte to obtain a spliced high and middle byte value of the first high, middle, and low byte;
    comparing the spliced high and middle byte value of the first high, middle, and low byte with the spliced high and middle byte value of the second high, middle, and low byte; and
    determining the processed data packet is the abnormal data when the spliced high and middle byte value of the first high, middle, and low byte is different from the spliced high and middle byte value of the second high, middle, and low byte.

5. The method as claimed in claim 4, wherein sequentially comparing the first high, middle, and low byte of the processed data packet with the second high, middle, and low byte of the integer value in the preset way, and determining whether the processed data packet is the abnormal data according to the comparison result, further comprises:
    splicing a high byte and a middle byte with a low byte of the second high, middle, and low byte to obtain a spliced high, middle, and low byte value of the second high, middle, and low byte when the spliced high and middle byte value of the first high, middle, and low byte is same as the spliced high and middle byte value of the second high, middle, and low byte, and splicing a high byte and a middle byte with a low byte of the first high, middle, and low byte to obtain a spliced high, middle, and low byte value of the first high, middle, and low byte;
    comparing the spliced high, middle, and low byte value of the first high, middle, and low byte with the spliced high, middle, and low byte value of the second high, middle, and low byte;
    determining the processed data packet is the abnormal data when the spliced high, middle, and low byte value of the first high, middle, and low byte is different from the spliced high, middle, and low byte value of the second high, middle, and low byte; and
    determining the processed data packet is normal data when the spliced high, middle, and low byte value of the first high, middle, and low byte is same as the spliced high, middle, and low byte value of the second high, middle, and low byte.

6. A system for analyzing data, the system for analyzing data comprising:
    at least one processor;
    a storage unit; and
    one or more programs that are stored in the storage unit and executed by the at least one processor, the one or more programs comprising instructions for:
        reading a data packet from a queue, and after performing data processing on the data packet, cyclically reading a first high, middle, and low byte of the processed data packet;

reading a preset signal reference value, and converting the preset signal reference value into a collected value according to a preset signal transformation ratio and a correction factor;

converting the collected value into an integer value, and splitting the integer value into a second high, middle, and low byte; and sequentially comparing the first high, middle and low byte of the processed data packet with the second high, middle and low byte of the integer value in a preset way, and determining whether the processed data packet is abnormal data according to a comparison result.

7. The system as claimed in claim 6, wherein performing data processing on the data packet further comprises:
removing a header and a tail of the data packet.

8. The system as claimed in claim 6, wherein sequentially comparing the first high, middle, and low byte of the processed data packet with the second high, middle, and low byte of the integer value in the preset way, and determining whether the processed data packet is the abnormal data according to the comparison result, further comprises:
comparing a high byte value of the first high, middle, and low byte with a high byte value of the second high, middle, and low byte; and determining the processed data packet is the abnormal data when the high byte value of the first high, middle, and low byte is different from the high byte value of the second high, middle, and low byte.

9. The system as claimed in claim 8, wherein sequentially comparing the first high, middle, and low byte of the processed data packet with the second high, middle, and low byte of the integer value in the preset way, and determining whether the processed data packet is the abnormal data according to the comparison result, further comprises:
splicing a high byte with a middle byte of the second high, middle, and low byte to obtain a spliced high and middle byte value of the second high, middle and low byte when the high byte value of the first high, middle, and low byte is same as the high byte value of the second high, middle, and low byte, and splicing a high byte with a middle byte of the first high, middle, and low byte to obtain a spliced high and middle byte value of the first high, middle, and low byte;

comparing the spliced high and middle byte value of the first high, middle, and low byte with the spliced high and middle byte value of the second high, middle, and low byte; and determining the processed data packet is the abnormal data when the spliced high and middle byte value of the first high, middle, and low byte is different from the spliced high and middle byte value of the second high, middle, and low byte.

10. The system as claimed in claim 9, wherein sequentially comparing the first high, middle, and low byte of the processed data packet with the second high, middle, and low byte of the integer value in the preset way, and determining whether the processed data packet is the abnormal data according to the comparison result, further comprises:
splicing a high byte and a middle byte with a low byte of the second high, middle, and low byte to obtain a spliced high, middle, and low byte value of the second high, middle, and low byte when the spliced high and middle byte value of the first high, middle, and low byte is same as the spliced high and middle byte value of the second high, middle, and low byte, and splicing a high byte and a middle byte with a low byte of the first high, middle, and low byte to obtain a spliced high, middle, and low byte value of the first high, middle, and low byte;

comparing the spliced high, middle, and low byte value of the first high, middle, and low byte with the spliced high, middle, and low byte value of the second high, middle, and low byte;

determining the processed data packet is the abnormal data when the spliced high, middle, and low byte value of the first high, middle, and low byte is different from the spliced high, middle, and low byte value of the second high, middle, and low byte; and determining the processed data packet is normal data when the spliced high, middle, and low byte value of the first high, middle, and low byte is same as the spliced high, middle, and low byte value of the second high, middle, and low byte.

11. A non-transitory computer-readable storage medium in which computer programs are stored, and the computer programs are executable by at least one processor, to enforce following steps:
reading a data packet from a queue, and after performing data processing on the data packet, cyclically reading a first high, middle, and low byte of the processed data packet;

reading a preset signal reference value, and converting the preset signal reference value into a collected value according to a preset signal transformation ratio and a correction factor;

converting the collected value into an integer value, and splitting the integer value into a second high, middle, and low byte; and sequentially comparing the first high, middle and low byte of the processed data packet with the second high, middle and low byte of the integer value in a preset way, and determining whether the processed data packet is abnormal data according to a comparison result.

12. The non-transitory computer-readable storage medium as claimed in claim 11, wherein performing the data processing on the data packet further comprises:
removing a header and a tail of the data packet.

13. The non-transitory computer-readable storage medium as claimed in claim 11, wherein sequentially comparing the first high, middle, and low byte of the processed data packet with the second high, middle, and low byte of the integer value in the preset way, and determining whether the processed data packet is the abnormal data according to the comparison result, further comprises:
comparing a high byte value of the first high, middle, and low byte with a high byte value of the second high, middle, and low byte; and determining the processed data packet is the abnormal data when the high byte value of the first high, middle, and low byte is different from the high byte value of the second high, middle, and low byte.

14. The non-transitory computer-readable storage medium as claimed in claim 13, wherein sequentially comparing the first high, middle, and low byte of the processed data packet with the second high, middle, and low byte of the integer value in the preset way, and determining whether the processed data packet is the abnormal data according to the comparison result, further comprises:
splicing a high byte with a middle byte of the second high, middle, and low byte to obtain a spliced high and middle byte value of the second high, middle and low byte when the high byte value of the first high, middle, and low byte is same as the high byte value of the second high, middle, and low byte, and splicing a high byte with a middle byte of the first high, middle, and low byte to obtain a spliced high and middle byte value of the first high, middle, and low byte;

comparing the spliced high and middle byte value of the first high, middle, and low byte with the spliced high and middle byte value of the second high, middle, and low byte; and determining the processed data packet is the abnormal data when the spliced high and middle byte value of the first high, middle, and low byte is different from the spliced high and middle byte value of the second high, middle, and low byte.

15. The non-transitory computer-readable storage medium as claimed in claim 14, wherein sequentially comparing the first high, middle, and low byte of the processed data packet with the second high, middle, and low byte of the integer value in the preset way, and determining whether the processed data packet is the abnormal data according to the comparison result, further comprises:

splicing a high byte and a middle byte with a low byte of the second high, middle, and low byte to obtain a spliced high, middle, and low byte value of the second high, middle, and low byte when the spliced high and middle byte value of the first high, middle, and low byte is same as the spliced high and middle byte value of the second high, middle, and low byte, and splicing a high byte and a middle byte with a low byte of the first high, middle, and low byte to obtain a spliced high, middle, and low byte value of the first high, middle, and low byte;

comparing the spliced high, middle, and low byte value of the first high, middle, and low byte with the spliced high, middle, and low byte value of the second high, middle, and low byte;

determining the processed data packet is the abnormal data when the spliced high, middle, and low byte value of the first high, middle, and low byte is different from the spliced high, middle, and low byte value of the second high, middle, and low byte; and determining the processed data packet is normal data when the spliced high, middle, and low byte value of the first high, middle, and low byte is same as the spliced high, middle, and low byte value of the second high, middle, and low byte.

* * * * *